(12) United States Patent
Hessing et al.

(10) Patent No.: US 8,720,891 B2
(45) Date of Patent: May 13, 2014

(54) IMAGE CAPTURING CARD SHUFFLER

(75) Inventors: Lynn Hessing, Boise, ID (US); Daniel Mahoney, Star, ID (US); Steven J. Blad, Henderson, NV (US); Thomas Baker, Meridian, ID (US)

(73) Assignee: SHFL Entertainment, Inc., Las Vegas, NV (US)

(*) Notice: Subject to any disclaimer, the term of this patent is extended or adjusted under 35 U.S.C. 154(b) by 1898 days.

(21) Appl. No.: 11/177,013

(22) Filed: Jul. 7, 2005

(65) Prior Publication Data

US 2011/0198804 A1 Aug. 18, 2011

Related U.S. Application Data

(63) Continuation of application No. 11/087,487, filed on Mar. 23, 2005, now Pat. No. 7,976,023, which is a continuation of application No. 10/067,794, filed on Feb. 8, 2002, now Pat. No. 6,886,829.

(51) Int. Cl.
*G06F 17/00* (2006.01)
*A63F 1/12* (2006.01)
*G07F 17/32* (2006.01)
*A63F 3/00* (2006.01)

(52) U.S. Cl.
CPC . *A63F 1/12* (2013.01); *G07F 17/32* (2013.01); *G07F 17/3293* (2013.01); *A63F 2003/00164* (2013.01)
USPC ............................. 273/149 R; 463/12; 463/42

(58) Field of Classification Search
CPC . A63F 1/12; A63F 2003/00164; G07F 17/32; G07F 17/3293
USPC .................................. 273/149 R; 463/12, 42
See application file for complete search history.

(56) References Cited

U.S. PATENT DOCUMENTS

| | | | |
|---|---|---|---|
| 130,281 | A | 8/1872 | Coughlin |
| 793,489 | A | 6/1905 | Williams |

(Continued)

FOREIGN PATENT DOCUMENTS

| | | |
|---|---|---|
| AU | 50254/79 | 3/1980 |
| EP | 0 777 514 | 2/2000 |

(Continued)

OTHER PUBLICATIONS

Scarne's Encyclopedia of Games by John Scarne, 1973, "Super Contract Bridge", p. 153.

(Continued)

*Primary Examiner* — Michael Cuff
(74) *Attorney, Agent, or Firm* — TraskBritt

(57) ABSTRACT

The present invention features a playing card shuffling device, which through the use of a small image capturing means, captures an image of a face value of each card and stores the image in memory. This image is sorted in the format of a bitmap image. An operator of the device would be able to recall, through the use of a keypad, the images of the cards that comprised individual hands in the previous game. This feature allows for verification of a winning hand after a game has been completed. Thereby, a quick recheck of hands before playing a winning hand is performed. The face value of each card is determined by character recognition software. These card values would be stored in memory for archival access for use in monitoring the randomness of the game and determining the number of winnings hands.

23 Claims, 3 Drawing Sheets

(56) References Cited

U.S. PATENT DOCUMENTS

| | | | |
|---|---|---|---|
| 1,014,219 A | 1/1912 | Hall |
| 1,850,114 A | 6/1929 | McCaddin |
| 1,885,276 A | 11/1932 | McKay |
| 1,955,926 A | 4/1934 | Matthaey |
| 2,001,220 A | 5/1935 | Smith |
| 2,001,918 A | 5/1935 | Nevius |
| 2,016,030 A | 10/1935 | Woodruff et al. |
| 2,043,343 A | 6/1936 | Warner |
| 2,065,824 A | 12/1936 | Plass |
| 2,159,958 A | 5/1939 | Sachs |
| 2,185,474 A | 1/1940 | Nott |
| 2,543,522 A | 2/1951 | Cohen |
| 2,588,582 A | 3/1952 | Sivertson |
| 2,661,215 A | 12/1953 | Stevens |
| 2,676,020 A | 4/1954 | Ogden |
| 2,701,720 A | 2/1955 | Ogden |
| 2,705,638 A | 4/1955 | Newcomb |
| 2,711,319 A | 6/1955 | Morgan et al. |
| 2,714,510 A | 8/1955 | Oppenlander et al. |
| 2,717,782 A | 9/1955 | Droll |
| 2,727,747 A | 12/1955 | Semisch, Jr. |
| 2,731,271 A | 1/1956 | Brown |
| 2,747,877 A | 5/1956 | Howard |
| 2,755,090 A | 7/1956 | Aldrich |
| 2,757,005 A | 7/1956 | Nothaft |
| 2,760,779 A | 8/1956 | Ogden et al. |
| 2,778,643 A | 1/1957 | Williams |
| 2,778,644 A | 1/1957 | Stephenson |
| 2,782,040 A | 2/1957 | Matter |
| 2,790,641 A | 4/1957 | Adams |
| 2,793,863 A | 5/1957 | Liebelt |
| 2,815,214 A | 12/1957 | Hall |
| 2,821,399 A | 1/1958 | Heinoo |
| 2,937,739 A | 5/1960 | Levy |
| 2,950,005 A | 8/1960 | MacDonald |
| 3,067,885 A | 12/1962 | Kohler |
| 3,107,096 A | 10/1963 | Osborn |
| 3,131,935 A | 5/1964 | Grönneberg |
| 3,147,978 A | 9/1964 | Sjöstrand |
| 3,235,741 A | 2/1966 | Plaisance |
| 3,305,237 A | 2/1967 | Granius |
| 3,312,473 A | 4/1967 | Friedman et al. |
| 3,588,116 A | 6/1971 | Miura |
| 3,589,730 A | 6/1971 | Slay |
| 3,595,388 A | 7/1971 | Castaldi |
| 3,627,331 A | 12/1971 | Erickson |
| 3,666,270 A | 5/1972 | Mazur |
| 3,690,670 A | 9/1972 | Cassady et al. |
| 3,716,238 A | 2/1973 | Porter |
| 3,861,261 A | 1/1975 | Maxey |
| 3,897,954 A | 8/1975 | Erickson et al. |
| 3,929,339 A | 12/1975 | Mattioli |
| 3,944,230 A | 3/1976 | Fineman |
| 3,949,219 A | 4/1976 | Crouse |
| 3,968,364 A | 7/1976 | Miller |
| 4,033,590 A | 7/1977 | Pic |
| 4,159,581 A | 7/1979 | Lichtenberg |
| 4,162,649 A | 7/1979 | Thornton |
| 4,232,861 A | 11/1980 | Maul |
| 4,280,690 A | 7/1981 | Hill |
| 4,310,160 A | 1/1982 | Willette et al. |
| 4,361,393 A | 11/1982 | Noto |
| 4,368,972 A | 1/1983 | Naramore |
| 4,369,972 A | 1/1983 | Parker |
| 4,374,309 A | 2/1983 | Walton |
| 4,385,827 A | 5/1983 | Naramore |
| 4,388,994 A | 6/1983 | Suda et al. |
| 4,397,469 A | 8/1983 | Carter, III |
| 4,421,312 A | 12/1983 | Delgado et al. |
| 4,421,501 A | 12/1983 | Scheffer |
| 4,497,488 A | 2/1985 | Plevyak et al. |
| 4,512,580 A | 4/1985 | Matviak |
| 4,513,969 A | 4/1985 | Samsel, Jr. |
| 4,515,367 A | 5/1985 | Howard |
| 4,534,562 A | 8/1985 | Cuff et al. |
| 4,566,782 A | 1/1986 | Britt et al. |
| 4,586,712 A | 5/1986 | Lorber et al. |
| 4,659,082 A | 4/1987 | Greenberg |
| 4,662,637 A | 5/1987 | Pfeiffer |
| 4,662,816 A | 5/1987 | Fabrig |
| 4,667,959 A | 5/1987 | Pfeiffer et al. |
| 4,741,524 A | 5/1988 | Bromage |
| 4,750,743 A | 6/1988 | Nicoletti |
| 4,759,448 A | 7/1988 | Kawabata |
| 4,770,421 A | 9/1988 | Hoffman |
| 4,807,884 A | 2/1989 | Breeding |
| 4,822,050 A | 4/1989 | Normand et al. |
| 4,832,342 A | 5/1989 | Plevyak et al. |
| 4,876,000 A | 10/1989 | Mikhail |
| 4,900,009 A | 2/1990 | Kitahara et al. |
| 4,904,830 A | 2/1990 | Rizzuto |
| 4,948,134 A | 8/1990 | Suttle et al. |
| 4,951,950 A | 8/1990 | Normand et al. |
| 4,969,648 A | 11/1990 | Hollinger et al. |
| 5,000,453 A | 3/1991 | Stevens et al. |
| 5,067,713 A | 11/1991 | Soules et al. |
| 5,078,405 A | 1/1992 | Jones et al. |
| 5,102,293 A | 4/1992 | Schneider |
| 5,121,921 A | 6/1992 | Friedman et al. |
| 5,154,429 A | 10/1992 | LeVasseur |
| 5,199,710 A | 4/1993 | Lamle |
| 5,240,140 A | 8/1993 | Huen |
| 5,261,667 A | 11/1993 | Breeding |
| 5,275,411 A | 1/1994 | Breeding |
| 5,288,081 A | 2/1994 | Breeding |
| 5,303,921 A | 4/1994 | Breeding |
| 5,356,145 A | 10/1994 | Verschoor |
| 5,374,061 A | 12/1994 | Albrecht |
| 5,382,024 A | 1/1995 | Blaha |
| 5,382,025 A | 1/1995 | Sklansky et al. |
| 5,390,910 A | 2/1995 | Mandel et al. |
| 5,431,399 A | 7/1995 | Kelley |
| 5,437,462 A | 8/1995 | Breeding |
| 5,445,377 A | 8/1995 | Steinbach |
| 5,575,475 A | 11/1996 | Steinbach |
| 5,584,483 A | 12/1996 | Sines et al. |
| 5,586,936 A | 12/1996 | Bennett et al. |
| 5,605,334 A | 2/1997 | McCrea, Jr. |
| 5,669,816 A | 9/1997 | Garczynski et al. |
| 5,676,372 A | 10/1997 | Sines et al. |
| 5,681,039 A | 10/1997 | Miller |
| 5,683,085 A | 11/1997 | Johnson et al. |
| 5,690,324 A | 11/1997 | Otomo et al. |
| 5,692,748 A | 12/1997 | Frisco et al. |
| 5,695,189 A | 12/1997 | Breeding et al. |
| 5,707,287 A | 1/1998 | McCrea, Jr. |
| 5,718,427 A | 2/1998 | Cranford et al. |
| 5,719,288 A | 2/1998 | Sens et al. |
| 5,722,893 A | 3/1998 | Hill et al. |
| 5,735,525 A | 4/1998 | McCrea, Jr. |
| 5,772,505 A | 6/1998 | Garczynski et al. |
| 5,779,546 A | 7/1998 | Meissner et al. |
| 5,802,560 A * | 9/1998 | Joseph et al. ............... 711/119 |
| 5,803,808 A | 9/1998 | Strisower |
| 5,810,355 A | 9/1998 | Trilli |
| 5,813,326 A | 9/1998 | Salomon |
| 5,814,796 A | 9/1998 | Benson et al. |
| 5,941,769 A | 8/1999 | Order |
| 5,944,310 A | 8/1999 | Johnson et al. |
| 5,989,122 A | 11/1999 | Roblejo |
| 6,019,368 A * | 2/2000 | Sines et al. ............... 273/149 R |
| 6,039,650 A * | 3/2000 | Hill ............................... 463/47 |
| 6,068,258 A | 5/2000 | Breeding et al. |
| 6,093,103 A | 7/2000 | McCrea, Jr. |
| 6,117,012 A | 9/2000 | McCrea, Jr. |
| 6,126,166 A | 10/2000 | Lorson et al. |
| 6,139,014 A | 10/2000 | Breeding et al. |
| 6,149,154 A | 11/2000 | Grauzer et al. |
| 6,165,069 A | 12/2000 | Sines et al. |
| 6,165,072 A | 12/2000 | Davis et al. |
| 6,217,447 B1 | 4/2001 | Lofink et al. |
| 6,250,632 B1 | 6/2001 | Albrecht |
| 6,254,096 B1 | 7/2001 | Grauzer et al. |
| 6,254,484 B1 * | 7/2001 | McCrea, Jr. ............... 463/27 |

(56) References Cited

U.S. PATENT DOCUMENTS

| | | |
|---|---|---|
| 6,267,248 B1 | 7/2001 | Johnson et al. |
| 6,270,404 B2 | 8/2001 | Sines et al. |
| 6,293,546 B1 * | 9/2001 | Hessing et al. ............. 273/138.2 |
| 6,299,167 B1 | 10/2001 | Sines et al. |
| 6,299,534 B1 | 10/2001 | Breeding et al. |
| 6,299,536 B1 | 10/2001 | Hill |
| 6,308,886 B1 | 10/2001 | Benson et al. |
| 6,325,373 B1 | 12/2001 | Breeding et al. |
| 6,346,044 B1 | 2/2002 | McCrea, Jr. |
| 6,361,044 B1 | 3/2002 | Block et al. |
| 6,402,142 B1 | 6/2002 | Warren et al. |
| 6,403,908 B2 | 6/2002 | Stardust et al. |
| 6,454,266 B1 | 9/2002 | Breeding et al. |
| 6,460,848 B1 | 10/2002 | Soltys et al. |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,530,836 B2 | 3/2003 | Soltys et al. |
| 6,530,837 B2 | 3/2003 | Soltys et al. |
| 6,533,276 B2 | 3/2003 | Soltys et al. |
| 6,533,662 B2 | 3/2003 | Soltys et al. |
| 6,568,678 B2 | 5/2003 | Breeding et al. |
| 6,579,180 B2 | 6/2003 | Soltys et al. |
| 6,579,181 B2 | 6/2003 | Soltys et al. |
| 6,582,301 B2 | 6/2003 | Hill |
| 6,588,750 B1 | 7/2003 | Grauzer et al. |
| 6,588,751 B1 | 7/2003 | Grauzer et al. |
| 6,629,889 B2 | 10/2003 | Mothwurf |
| 6,629,894 B1 | 10/2003 | Purton |
| 6,637,622 B1 | 10/2003 | Robinson |
| 6,651,981 B2 | 11/2003 | Grauzer et al. |
| 6,651,982 B2 | 11/2003 | Grauzer et al. |
| 6,651,985 B2 | 11/2003 | Sines et al. |
| 6,655,684 B2 | 12/2003 | Grauzer et al. |
| 6,658,135 B1 * | 12/2003 | Morito et al. ................. 382/100 |
| 6,659,460 B2 | 12/2003 | Blaha et al. |
| 6,663,490 B2 | 12/2003 | Soltys et al. |
| 6,676,127 B2 | 1/2004 | Johnson et al. |
| 6,688,979 B2 | 2/2004 | Soltys et al. |
| 6,698,756 B1 | 3/2004 | Baker et al. |
| 6,712,696 B2 | 3/2004 | Soltys et al. |
| 6,719,288 B2 | 4/2004 | Hessing et al. |
| 6,722,974 B2 | 4/2004 | Sines et al. |
| 6,726,205 B1 | 4/2004 | Purton |
| 6,758,751 B2 | 7/2004 | Soltys et al. |
| 6,842,263 B1 * | 1/2005 | Saeki ............................ 358/1.15 |
| 6,886,829 B2 | 5/2005 | Hessing et al. |
| 6,889,979 B2 | 5/2005 | Blaha et al. |
| 6,905,121 B1 | 6/2005 | Timpano |
| 6,959,925 B1 | 11/2005 | Baker et al. |
| 6,988,516 B2 | 1/2006 | Debaes et al. |
| 7,028,598 B2 | 4/2006 | Teshima |
| 7,036,818 B2 | 5/2006 | Grauzer et al. |
| 7,059,602 B2 | 6/2006 | Grauzer et al. |
| 7,066,464 B2 | 6/2006 | Blad et al. |
| 7,073,791 B2 | 7/2006 | Grauzer et al. |
| 7,114,718 B2 | 10/2006 | Grauzer et al. |
| 7,137,627 B2 | 11/2006 | Grauzer et al. |
| 7,213,812 B2 | 5/2007 | Schubert et al. |
| 7,234,698 B2 | 6/2007 | Grauzer et al. |
| 7,255,344 B2 | 8/2007 | Grauzer et al. |
| 7,261,294 B2 | 8/2007 | Grauzer et al. |
| 7,264,241 B2 | 9/2007 | Schubert et al. |
| 7,278,923 B2 | 10/2007 | Grauzer et al. |
| 7,322,576 B2 | 1/2008 | Grauzer et al. |
| 7,338,044 B2 | 3/2008 | Grauzer et al. |
| 7,367,561 B2 | 5/2008 | Blaha et al. |
| 7,374,170 B2 | 5/2008 | Grauzer et al. |
| 7,384,044 B2 | 6/2008 | Grauzer et al. |
| 7,407,438 B2 | 8/2008 | Schubert et al. |
| 7,413,191 B2 | 8/2008 | Grauzer et al. |
| 7,461,843 B1 | 12/2008 | Baker et al. |
| 7,976,023 B1 | 7/2011 | Hessing et al. |
| 2002/0017481 A1 | 2/2002 | Johnson et al. |
| 2002/0063389 A1 | 5/2002 | Breeding et al. |
| 2002/0068635 A1 | 6/2002 | Hill |
| 2003/0071413 A1 | 4/2003 | Blaha et al. |
| 2003/0073498 A1 | 4/2003 | Grauzer et al. |
| 2007/0057469 A1 | 3/2007 | Grauzer et al. |
| 2007/0222147 A1 | 9/2007 | Blaha et al. |
| 2008/0006997 A1 | 1/2008 | Scheper et al. |
| 2008/0006998 A1 | 1/2008 | Grauzer et al. |

FOREIGN PATENT DOCUMENTS

| | | |
|---|---|---|
| JP | 2002-165916 | 6/2002 |
| WO | WO 87/00764 | 2/1987 |
| WO | WO 98/14249 | 4/1998 |
| WO | WO 98/40136 | 9/1998 |
| WO | WO 99/52611 | 10/1999 |
| WO | WO 00/51076 | 8/2000 |
| WO | WO 2006/031472 | 3/2006 |

OTHER PUBLICATIONS

International Search Report for International Application No. PCT/US2003/015393, mailed Oct. 6, 2003.

Specification of Australian Patent Application No. Not listed, filed Aug. 15, 1994, Applicants: Rodney G. Johnson et al., Title: Card Handling Apparatus.

* cited by examiner

IMAGE CAPTURING CARD SHUFFLER

CROSS REFERENCE TO RELATED APPLICATIONS

This application is a continuation of application Ser. No. 11/087,487 filed Mar. 23, 2005, now U.S. Pat. No. 7,976,023, issued Jul. 12, 2011, which is a continuation of application Ser. No. 10/067,794 filed Feb. 8, 2002 now U.S. Pat. No. 6,886,829 issued May 3, 2005.

FIELD OF THE INVENTION

The present invention relates to card shuffler devices for live card games and, more particularly, to a card shuffling system controlled by a computer, which is able to capture an image, store, keep track of, and deliver random playing cards, and display the images of the cards.

DISCUSSION OF THE PRIOR ART

Card shuffling machines are electro-mechanical devices that are designed to reorder a deck or multiple decks of playing cards for use in casino games. Recently, games have been developed that require shuffling a single deck of cards into a random order and the delivery of hands of cards to each player. These hands are removed from the machine by an operator and given to the players. Several game strategies require the hands of cards to be delivered to the players in different amounts depending on the selected game. For example, there may be 3, 5, 7 or more cards per hand in each different game. For security reasons, some shufflers count the number of cards in the deck each time a game is dealt.

With players at numerous removed sites for the live card games, a security problem exists that becomes critically important, as there exists a substantial risk of cheating and/or card counting. A need, therefore, exists to create a secure environment that permits the operation of live card games while providing significant security to prevent cheating and card counting.

Pfeiffer et al. (U.S. Pat. No. 4,667,959) discloses an apparatus for storing and selecting cards. The apparatus contains a rotatably mounted carousel, which dispenses playing cards with rollers to slots of an output port. Cards are pre-marked with known markings, such as bar codes, so that the apparatus can keep track of which slot holds which card. A sensor reads the identification markings on the cards.

Soules et al. (U.S. Pat. No. 5,067,713) teaches of coded playing cards and apparatuses for dealing sets of cards. There is provided a deck of cards which is encoded with a bar code that is invisible to the human eye. The cards are coded using an essentially invisible bar code that can be read by an electro-optical reading means which uses light in the infrared or ultra-violet range. The object of this apparatus is to allow the dealer to deal coded playing cards.

The patent to Albrecht (U.S. Pat. No. 5,374,061) discloses a card dispensing shoe having a counting device and method of using. A system is described which uses a specially coded deck of cards indicating the value and suit of the card. The system involves using a special pack of cards encoded with information carrying two types of data: numerical digits and alphabetical characters. The numerical information corresponds to the card value, and the alphabetical information indicates the series of the pack of cards. This information is in the form of the bar code, or some other machine readable format. The sensor senses the code on each card as it is being dealt.

Hill et al. (U.S. Pat. No. 5,722,893) discloses a card dispensing shoe that has a card scanner. The scanner senses each card as it moves downwardly and out from the shoe. The scanner may be an infrared laser scanner capable of reading a bar code imprinted on the cards. Hill et al. also discloses the optical scanning of the cards resulting in a high resolution array which is stored in memory for converting into word vectors. These vectors are subsequently used as input to a feed-forward neural network which is trained using error-back propagation to sense and recognize the possible card suits and card values.

Meissner et al. (U.S. Pat. No. 5,779,546) teaches of an automated gaming system and method of automated gaming. An automated dealing shoe automatically advances and interprets the value of a playing card and provides an interface to a computing system. Optical sensors are employed to record the number of spots and their respective spatial relations to thereby determine the card value McCrea, Jr. has a series of patents teaching of a card shuffling device having image capturing means. These U.S. Pat. Nos. 5,605,334; 5,707,287; 5,735,525; 6,093,103; and 6,117,012 disclose the need for game control via accurately collecting and storing the suit and value of each card received by each player position. The game control stores this information in a memory or a history of each card dealt is recorded. The game control can thus detect winning progressions and automatically issue an award signal.

None of these patents either teaches or suggests a card shuffling device that can shuffle the playing cards in a random order, capture images of the playing cards before output, process the images of the cards, and display the images of the cards, all within the confines of the shuffler. There is no need for complicated card-recognition software, or transforming the image into word vectors, or other card value data expressions, because the images are relayed directly to a display on the shuffler device.

SUMMARY OF THE INVENTION

In the essence of security, this invention expands game security to a higher level. Through the use of image capturing means, e.g., a small digital camera, an image of the face value of each card is taken and stored in computer memory. This image is stored in the format of a bit map image. The operator of the machine would be able to recall, through the use of a key pad, the images of the cards that comprised the individual hands in the previous game or games. This feature would allow the verification of a winning hand after the game had been completed.

One of the biggest game security issues is that of two adjacent players trading cards to produce a winning hand for one of them. The present invention would allow a quick recheck of hands before paying a winning hand. These card images would be stored in memory for archival access for use in monitoring the randomness of the game and determining the number of winning hands. Such information would be very valuable in managing game play.

Therefore, it is an object of the invention to provide a card playing system which shuffles and deals playing cards, and provided with a means for capturing images of the cards being dealt for use in verification, thereby enhancing security matters regarding casino games.

It is another object of the invention to provide a card shuffler which can selectively shuffle playing cards for different card games and/or for different shuffling modes of operation, and is capable of capturing the images of the cards that are dealt.

It is another object of the invention to provide a card shuffler capable of displaying the images of the playing cards to an operator for verification of winning hands.

It is an additional object of the invention to provide a card shuffling machine that selectively shuffles cards for at least two different card games having different shuffling requirements and between at least two selectable modes of operation which can be defined by at least the two different card games, with the added security of card image capturing and relaying of the images for each play station.

It is another object of the invention to provide a card playing system which is simplified and inexpensive to manufacture which provides image capture and on-site image display of the cards being dealt.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

This disclosure of the invention is submitted in furtherance of the constitutional purposes of the United States Patent Laws "to promote the progress of science and useful arts" (Article 1, Section 8).

In accordance with a preferred embodiment of the present invention, herein is described a card shuffler machine which is capable of eliminating one of the most significant security issues: cheating by the substitution of cards. These security issues are more prevalent in specialty card games, such as, but not limited to, Pai Gow Poker. The nature of these games provides possibilities of interactions between card players and/or card counters to manipulate the outcomes of the winnings. As novel means of enhancing game security are needed, the present invention addresses this need by featuring a card shuffler device 100 which can capture an image of the playing cards being dealt, as illustrated generally in FIG. 1.

Figure 1:
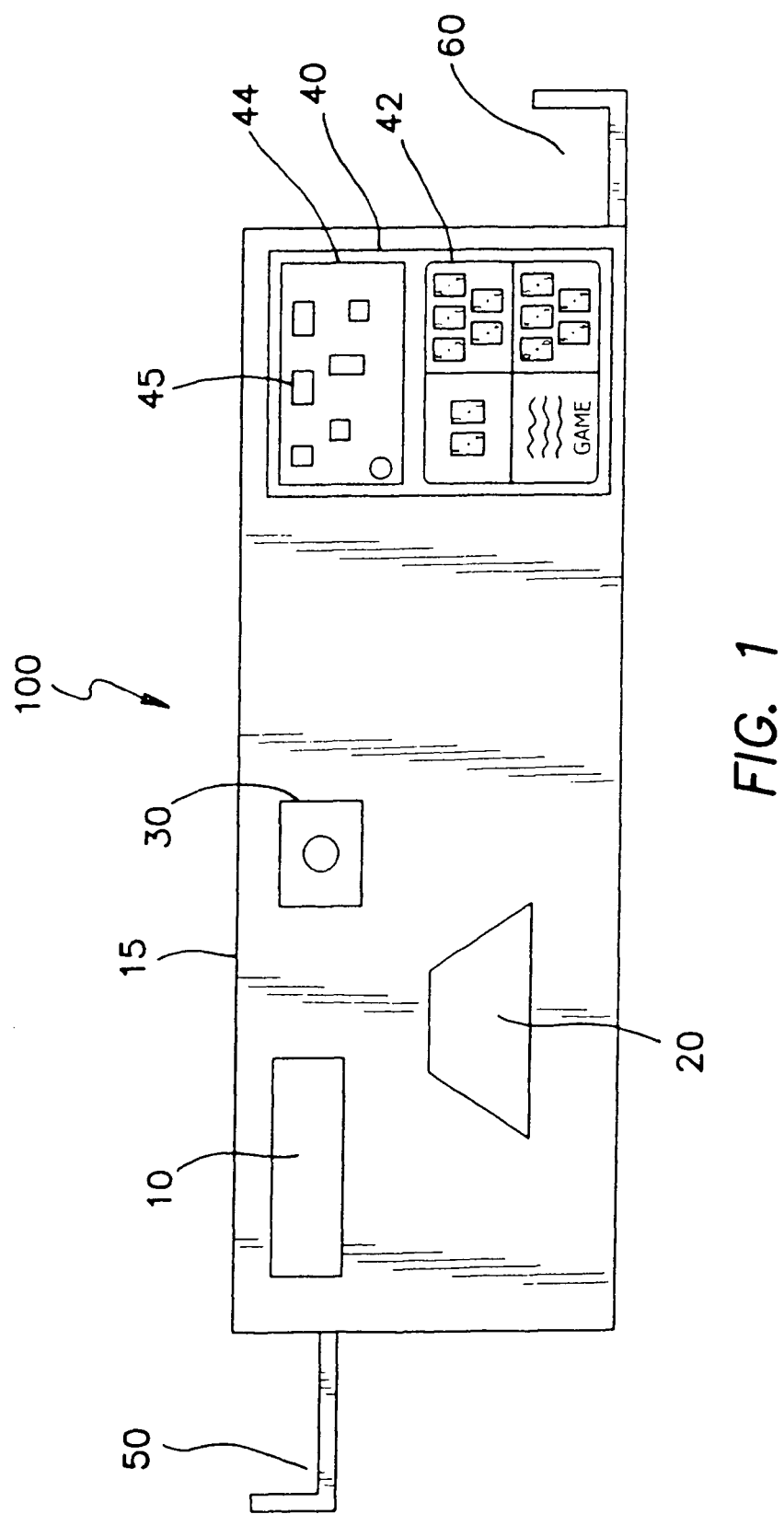
FIG. 1 is a plan view of the preferred embodiment of the invention.

FIG. 1 generally illustrates a diagrammatic or schematic depiction of the card shuffler system 100 of the present invention. The system 100 includes six major components of operation: the controller, the shuffling device 2, image capturing means 30, control panel 40, a card input receptacle 50, and card output bin 60.

Figure 2:
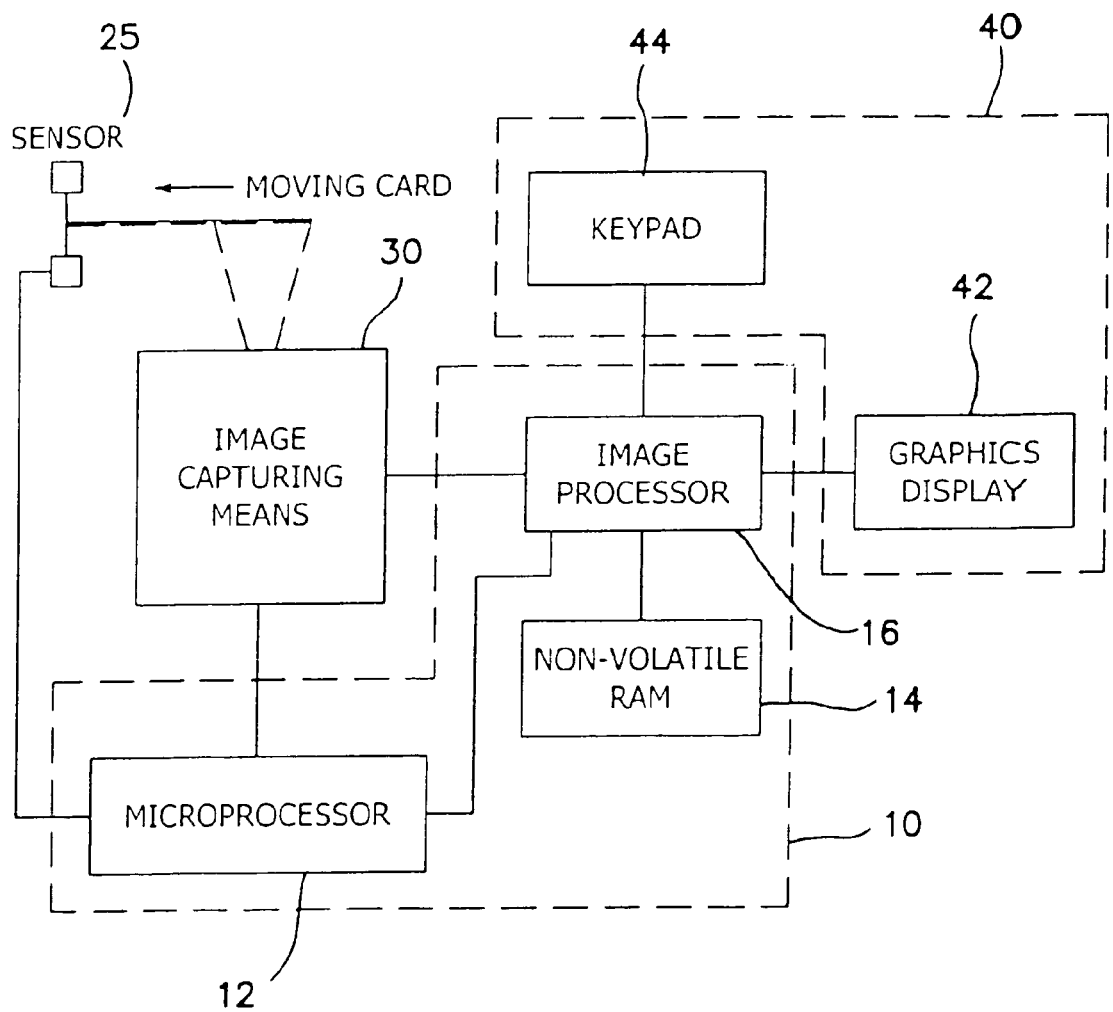
FIG. 2 is a schematic view of a preferred embodiment of the invention illustrating the components in operation.

Preferably, the housing is made of sheet metal (such as aluminum), durable plastic or other tough, durable materials. Keys 45 on keypad 44 are preferably tactile feedback keys, and include indicia thereon for identifying a command a key communicates to a microprocessor 12 (FIG. 2). The keys can also be made of silicon rubber-carbon as is typical for such keys, or the keypad can be a membrane keypad. Controller 10 (and ultimately microprocessor 12) controls the operation of the shuffler system 100 by accepting input data from control panel 40, and displaying output data on display 42. However, it will be understood that other display technologies known in the art, for example, vacuum fluorescent, flat panel display, and segmented LED's, are within the scope of the present invention.

The controller 10 is a system that controls the operation of a shuffling device 20, image capturing means 30, and display means 40 as well as the movement of the cards through the shuffler system 100. The controller 10 contains a suitable microprocessor which serves to orchestrate the operation of all of the components of the shuffler system 100.

This invention includes novel methods for performing automated shuffling of playing cards. The methods include shuffling the cards in a face-to-back relationship, which refers to the standard condition in which playing cards are sold wherein the face of one card is adjacent to the back of the next adjacent card. Herein, the present invention dismisses the need for pre-marked playing cards. Ordinary, unmarked playing cards may be used with ease.

The novel shuffling methods further include the ability to shuffle cards in more than one mode and for a plurality of card games as desired. In the card shuffling arts, two types of shufflers have been introduced. One is a batch mode shuffler and the other is a continuous mode shuffler.

The batch mode shuffler is a device that shuffles a deck or multiple decks of playing cards into a random order. The deck or decks are, at one time, loaded into the shuffler system 100, usually into an input receptacle 50. The cards are shuffled or re-ordered and presented to the output bin 60. The decks are removed all at once by a person (dealer) who divides the stack of cards, records (cuts) them, and places a marked cut card in the deck in a random position. The dealer then places the cards into a dealing shoe for individual dealing to players in a card game.

At the conclusion of each game, the cards of the hands that have been played by the players are collected from each playing station and discarded face down by the dealer into a discard shoe (not shown). The decks are then placed into the input receptacle 50 and forwarded to the shuffling device 20 to be re-shuffled to begin a new game. This process may include two sets of decks of different color card backs. One set would be shuffling while the other is being played. This reduces the time the game is stopped for shuffling, allowing the dealer to play more hands with the players.

The continuous shuffler is a device that shuffles or re-orders a deck or multiple decks of playing cards into a random order. In the use of this mechanism, the cards are constantly being shuffled by the shuffler system 100. At the end of each game, the cards are discarded directly into the input receptacle 50 of the shuffler 100. A dealing shoe (not shown) is generally built into the output bin 60 of the shuffler 100. The shuffling never stops as long as the game is being played or being prepared to play.

The process of discharging the playing cards is preferably performed by the ejection and displacing of playing cards and forcing them into an output bin 60, for example, as described in detail in U.S. Pat. No. 6,299,167, incorporated herein by reference. Extracting the cards is accomplished by engaging edges of the selected displaced card using a movable extractor. The step is more preferably accomplished by rolling the edges of the selected card using an extraction roller or rollers (not shown). The cards are further guided toward the output bin via an output roller. The image capturing means 30 may be placed between the extraction roller(s) and the output bin 60 (FIG. 1).

In a preferred embodiment of the present invention, the image capturing means 30 may be a digital camera. A conventional digital camera employing charge-coupled device (CCD) technology to obtain the light information of the captured image may be used. The CCD's consist of a semiconducting array of tightly packed rows of light receptors that can detect variation in light intensity and frequency.

The controller has an image processor 16, as shown in FIG. 2, which digitizes the light information gathered by the camera. This information is digitized by translating the recorded images into bitmaps. The bitmaps will then make use of the digitized information by translating it into an image-representation consisting of rows and columns of dots. The present invention includes an on-site image processor 16 which further translates the bitmaps into pixels for display on the display means 42.

Alternatively, the image capturing means 30 can comprise a digital camera (not shown) utilizing complementary metal-oxide semiconductor (CMOS) technology. Herein, CMOS chips have the advantage of using lower power requirements than CCDs. In addition, the CMOS sensor can be loaded with a host of other tasks that can be translated to the operation of the controller, such as analogue to digital converting, load signal processing, handling white balance and more camera controls. For example, CMOS chips are high-resolution sensors with space efficiency capability enabling sensor designs with the possibility of increasing density and bit depth without significant cost increases.

A digital video camera (DV camera) may also be employed to capture digital video images, thereby reducing steps of video microprocessing. The output of a DV camera is already in compressed format. Therefore, all that is needed is to transfer the recorded images straight from the camera for post capture processing.

Analog cameras (non-digital) may be used to capture the image of the cards. These may include video recording cameras. Herein, an analogue-to-digital converter may be used to simplify the image data for displaying output. Any suitable camera or camera-type device known in the art may be used to capture the image of the playing cards.

Any suitable means for capturing image data known in the art, such as, but not limited to, lenses, mirrors, fiber optics, fiber optical transmission tubes, optical sensor arrays, photo-sensitive diodes and/or any combinations thereof may be used to capture the photonic information and relayed to any choice of camera means to thereby obtain an image of the playing card.

FIG. 2 is a schematic diagram illustrating a systems approach to the operation of the shuffler system 100. A playing card is put into motion by extraction rollers after the shuffling is performed via instruction from the shuffler controller 10. Once the leading edge of this moving card is sensed by sensor 25, an image of the card is taken by the image capturing means 30. This image data is relayed to the image processor 16. The image processor 16 performs the post-capture processing steps. Herein the image data may be converted, mapped, sharpened and compressed. The controller 10 stores the image data in memory into a non-volatile RAM storage 14.

Figure 3:
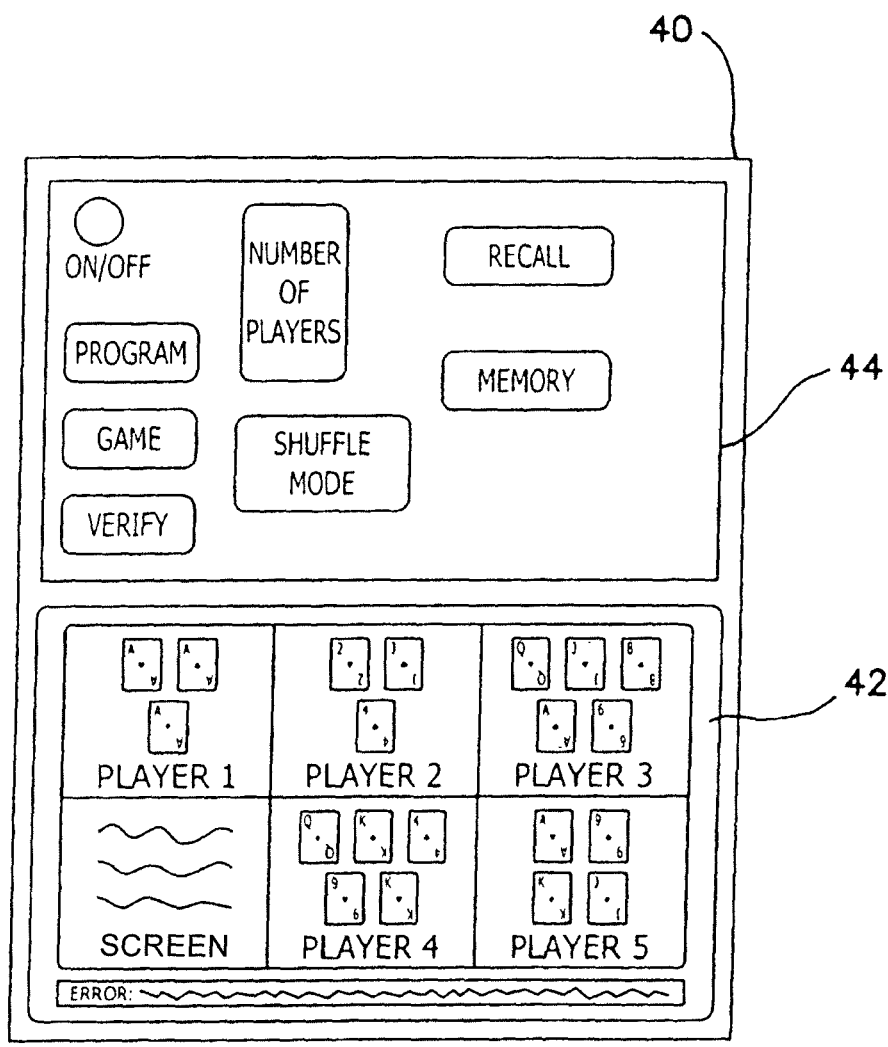
FIG. 3 is a plan view of the control panel in accordance with a preferred embodiment of the present invention.

This stored data may be recalled, by way of prompt messaging from the keypad 44, located on the control panel 40, for display by the graphics display 42. FIG. 3 provides an exemplary illustration of the control panel 40 including the operations controlled by the keypad 44 and images displayed on the display 42.

The microprocessor 12 controls the various functions of the shuffler system 100, for example, and without limitation, the manner of shuffling; whether the shuffling is in batch or continuous mode; the card game, or games, to be shuffled for or dealt, such as Pai Gow Poker, etc. (Again, it will be understood that the type of card game is not a limitation on the present invention). The microprocessor 12 can control the output of the cards such that each player is dealt either a packet of consecutive cards from the shuffled deck or every Nth card from the shuffled deck, N being the number of players plus the dealer (if applicable) at the table.

The microprocessor 12 operates under instruction of programmed software. This software can either be stored as firmware in an application specific memory chip, in a solid state non-volatile memory device or on a magnetic disk from which the software is loaded into an addressable RAM in shuffler system 100 when power is turned on. When the shuffler system 100 is first powered on, the software initializes and clears the display 42.

The operation of selected commands associated with the keys 45 of the control panel 40 will now be described. It will be understood that any of the keys 45 can be included anywhere on the shuffler system 100, and not limited to the control panel 40. In operation, when any key, switch or button is activated by depressing, switching or the like, a signal is electrically transmitted then from the controller 20. A predetermined command is transmitted then from the controller 20 to the shuffler 100 via transmission means. The shuffler 100 then performs the function associated with the command.

The control panel 40 can also include a "GAME" key. The "GAME" key (as shown in FIG. 3) allows the operator to select the type of card game to be played. Different card games require different shuffling and/or dealing methods. When the "GAME" key is depressed, the name of a card game appears on the display 42. The operator can cycle through the different games programmed into the microprocessor's memory by repeatedly pressing the "GAME" key until the desired game is selected. In an alternative embodiment, the control panel 40 can include separate keys for each different card game, or conventional query may be used.

The number of players may be entered by a "NUMBER OF PLAYERS" key (also shown in FIG. 3), thereby instructing the microprocessor 12 to deal a desired number of hands. If there are any particular rules or other information that may alter gameplay, a "PROGRAM" key may be employed to make appropriate changes.

The keypad 44 can include a "VERIFY" key. The "VERIFY" key is provided so that the operator can verify the number of cards that are in the deck at a desired time. Via the microprocessor 12, the shuffler system 100 keeps track of the number of cards that have been dealt during a dealing sequence. After a game, when the "VERIFY" key is pressed, the remaining cards are ejected out of the shuffler 100 into the output bin 60 and counted as they are ejected. This number is added to the number of cards that have been dealt to verify that there is a correct amount of cards in the deck (for example, 52, if one deck is being used). If the number of cards counted is incorrect, the dealer is notified, for example, by a phrase on the display 42, and/or an audible sound via an internal speaker (not shown).

The keypad 44 can also include a key or keys, such as a "GAME" key (as shown in FIG. 3) that prompts the shuffler system 100 to deal a certain number of cards, although it will be understood that any number is within the scope of the present invention.

Also, on the keypad 42 is a "RECALL" key that prompts the shuffler system 100 to recall the present hand or hands dealt to the playing stations. Herein, the images of the cards that are stored in memory 14 are recalled for display means 42. Along, with the image of the cards being displayed, textual message are displayed to designate the cards of each playing station, accordingly.

For example, the phrase "PLAYER 1" may be displayed along with the images of the cards dealt to that particular player, and so forth. A "MEMORY" key may be used, as shown in FIG. 3, to recall the playing hands dealt for past card games. This "MEMORY" key may have subkeys to cycle through the hands, games, and/or playing stations. The images of the past games are accessed from the memory 14 and displayed on the display means 42.

The keypad 44 can also include other keys, such as "SHUFFLE MODE," for selecting the mode of the shuffler, namely, continuous mode, batch mode, the game or games being played, or specialty game mode. The function of the various keys, switches or buttons recited herein is intended to be merely exemplary, and those skilled in the art will be able to make numerous modifications and additions to them without departing from the spirit of the present invention. Moreover, various keys may be soft keys, the function of which is defined by the bottom line on the display 14. The function of the soft keys may change, for example, with the type of game that is selected. This allows for a plurality of functions to be performed while minimizing the number of keys needed.

In a preferred embodiment, the shuffler system 100 includes an indicator for indicating an error condition. Preferably, a designated portion of the display 42 flashes to indicate an error condition. Such error conditions may include, but are not limited to, malfunction of the shuffler, such as a mis-shuffle or a jam in the shuffler, a failure in the electronics, bad deck count, i.e., too many or too few cards in the deck, etc. When the controller 10 receives an error signal, the controller 10 communicates a signal to the "ERROR" indicator, thereby activating the display 42 to indicate the error condition to the operator. Preferably, the display 42 indicates to the operator what the error condition is via an accompanying text message adjacent the "ERROR" indicator.

In a preferred embodiment, the shuffler system 100 includes a device for emitting an audible signal when an error condition is detected. For example, a speaker (not shown) such as an electromagnetic or piezoelectric speaker or the like that emits a beep or buzz when an error condition is detected. Preferably, the electromagnetic speaker is in communication and cooperates with the "ERROR" indicator on the display 42 and may be included on any portion of a housing 15.

In another embodiment, the controller 10 can be programmed to display messages on the display 42 in different languages, such as French, Spanish, Italian, etc. A key can be included for cycling through the various language choices.

The display 42 may preferably be in the form of a conventional liquid crystal display format (LCD). The display 42 can be a color or non-color LCD display panel. The display panel 42 may also display images and text data in a plurality of sections to show a plurality of play station information simultaneously. However, the display screen may have a scroll feature to display different screens of information which cannot be contained in a single display. The subsequent screens can be prompted by a "SCREEN" key, as shown in FIG. 3.

Since other modifications and changes varied to fit particular operating requirements and environments will be apparent to those skilled in the art, the invention is not considered limited to the example chosen for purposes of disclosure, and covers all changes and modifications which do not constitute a departure from the true spirit and scope of the invention.

In compliance with the statute, the invention has been described in language more or less specific as to structural and methodical features. It is to be understood, however, that the invention is not limited to the specific features shown and described, since the means herein disclosed comprise preferred means of putting the invention into effect. The invention is, therefore, claimed in any of its forms or modifications within the proper scope of the appended claims appropriately interpreted in accordance with the doctrine of equivalents.

Having thus described the invention, what is desired to be protected by Letters Patent is presented in the subsequent appended claims.

We claim:

1. A card shuffling apparatus comprising:
   a housing;
   a shuffling system within the housing configured to receive playing cards from a card input receptacle of the card shuffling apparatus and shuffle the playing cards into a random order;
   an image capturing device disposed within the housing, the image capturing device positioned and configured to capture image data of at least a portion of each playing card, the image data comprising at least a suit and a rank of each playing card; and
   a controller comprising a microprocessor and a memory disposed within the housing of the card shuffling apparatus, the controller configured to receive the image data of the at least a portion of each playing card from the image capturing device, and store the image data of the at least a portion of each playing card in the memory.

2. The card shuffling apparatus of claim 1, further comprising a control panel in communication with the controller, the control panel configured to receive entry of game identification to cause cards to be delivered to a card output bin specific for the game identification entered.

3. The card shuffling apparatus of claim 1, further comprising a display connected to the housing configured to display images representing dealt hands of cards.

4. The card shuffler apparatus of claim 1, wherein the controller is further configured to associate image data of particular playing cards of the image data of the at least a portion of each playing card to particular dealt hands of cards based on a number of hands selected via a control panel of the card shuffler apparatus.

5. The card shuffling apparatus of claim 4, wherein the memory is further configured to store image data of multiple playing cards for a plurality of playing stations and a plurality of games and wherein the controller is further configured to associate the stored image data of each card of the multiple playing cards to a particular playing station and a particular game.

6. The card shuffling apparatus of claim 1, wherein the controller further comprises embedded software for controlling operation of the image capturing device.

7. The card shuffler apparatus of claim 1, wherein the image capturing device is a digital camera.

8. The card shuffler apparatus of claim 7, wherein the digital camera is a digital video camera.

9. The card shuffling apparatus of claim 1, wherein the shuffling system is configured to selectively operate in each of a batch mode and a continuous mode, wherein the microprocessor within the housing is programmed to selectively operate the shuffling system to present all cards in the shuffling system for removal after randomization in the batch mode and the microprocessor is programmed to selectively operate the shuffling system to present packets consisting of fewer than all cards in the shuffling system for removal after randomization in the continuous mode.

10. A card shuffling apparatus comprising:
a housing;
a shuffling system located within the housing, the shuffling system being configured for receiving playing cards from an input receptacle and shuffling the playing cards into a random order;
an image capture device positioned within the housing and configured to capture image data of at least a portion of each playing card, the image data comprising at least a suit and a rank of each playing card; and
a controller located within the housing, the controller including a processor and a memory, the processor being programmed to selectively operate the shuffling system to deliver packets of cards in each of a batch mode and a continuous mode, the memory being configured to store image data captured by the image capture device, wherein the processor is programmed to selectively operate the shuffling system to present all cards in the shuffling system for removal after randomization in the batch mode and the processor is programmed to selectively operate the shuffling system to present packets consisting of fewer than all cards in the shuffling system for removal after randomization in the continuous mode.

11. The card shuffling apparatus of claim 10, further comprising a display configured to selectively display captured images of dealt hands of cards.

12. The card shuffling apparatus of claim 11, wherein the memory is configured to store image data of multiple playing cards for a plurality of multiple playing stations and a plurality of games.

13. The card shuffling apparatus of claim 11, wherein the controller further comprises embedded software for controlling operation of the image capture device.

14. A card shuffling apparatus comprising:
a housing;
a playing card shuffling mechanism within the housing;
an image capturing device within the housing, the image capturing device positioned and configured to capture image data of at least a portion of each playing card, the image data comprising at least a suit and a rank of each playing card;
a graphics display connected to the housing configured to selectively show images corresponding to the captured image data of playing cards forming one or more previously dealt hands of playing cards; and
a processor within the housing, wherein the processor is programmed to selectively operate the playing card shuffling mechanism to present all cards in the playing card shuffling mechanism for removal after randomization in a batch mode and the processor is programmed to selectively operate the playing card shuffling mechanism to present packets consisting of fewer than all cards in the playing card shuffling mechanism for removal after randomization in a continuous mode.

15. The card shuffling apparatus of claim 14, further comprising a controller, the controller comprising a microprocessor and a memory disposed within the housing, the controller configured to receive the image data of the at least a portion of each playing card from the image capturing device, and store the image data in the memory and enable recall of the stored image date to the graphics display.

16. The card shuffling apparatus of claim 15, wherein the image capturing device comprises a camera positioned within the housing and configured to capture the image data of the at least a portion of each playing card.

17. The card shuffling apparatus of claim 15, wherein the image capture device comprises a line scanner positioned within the housing and configured to capture the image data of the at least a portion of each playing card.

18. The card shuffling apparatus of claim 14, further comprising a control panel configured to receive entry of game identification to cause cards to be delivered to a card output bin specific for the game identification entered.

19. A card shuffling apparatus comprising:
a housing;
a shuffling system located within the housing, the shuffling system being configured for receiving playing cards from an input receptacle and shuffle the playing cards into a random order;
an image capturing device within the housing, the image capturing device positioned and configured to capture image data of at least a portion of each playing card, the image data comprising at least a suit and a rank of each playing card; and
a controller located within the housing, the controller including a processor and a memory, the processor being programmed to selectively operate the shuffling system to deliver packets of cards in each of a batch mode and a continuous shuffling mode, wherein the processor is programmed to selectively operate the shuffling system to present all cards in the shuffling system for removal after randomization in the batch mode and the processor is programmed to selectively operate the shuffling system to present packets consisting of fewer than all cards in the shuffling system for removal after randomization in the continuous mode, the memory being configured for storing the image data of the at least a portion of each playing card.

20. A card shuffling apparatus comprising:
a housing;
a shuffling system located within the housing, the shuffling system being configured for receiving playing cards from an input receptacle and shuffling the playing cards into a random order;
an image capturing device located within the housing, the image capturing device being positioned to capture image data of at least a portion of each playing card, the image data comprising at least a suit and a rank of each playing card;
a memory located within the housing, the memory being configured for storing the image data of the at least a portion of each playing card in the memory; and
a controller located within the housing, the controller including a processor programmed to selectively operate the shuffling system to deliver cards in each of a batch mode and a continuous mode, wherein the processor is programmed to selectively operate the shuffling system to present all cards in the shuffling system for removal after randomization in the batch mode and the processor is programmed to selectively operate the shuffling system to present packets consisting of fewer than all cards in the shuffling system for removal after randomization in the continuous mode, and to enable recall of the stored image data.

21. The card shuffling apparatus of claim 20, wherein the processor is further programmed to enable recall of the stored image data in the form of previously dealt hands of cards.

22. A card shuffling apparatus comprising:
a housing;
a card input receptacle connected to the housing;
a card delivery area connected to the housing;
a shuffling system within the housing configured to continually receive playing cards from the input receptacle and shuffle the cards into a random order;
an image capturing device located within the housing, the image capturing device being positioned to capture image data of at least a portion of each playing card, the image data comprising at least a suit and a rank of each playing card; and
a controller within the housing, the controller including a processor and a memory, the processor being programmed to selectively operate the shuffling system to deliver randomized packets of cards continually to the card delivery area, wherein fewer than all cards in a set of cards being shuffled are delivered after randomization, the memory being configured for storing the image data of the at least a portion of each playing card.

23. The card shuffling apparatus of claim 22, wherein the processor of the controller is further programmed to deliver cards individually into the delivery area, forming a randomly arranged packet of cards in the delivery area, and, when the packet of cards is manually removed, deliver additional cards individually to the delivery area, forming another packet of cards.

* * * * *